UNITED STATES PATENT OFFICE.

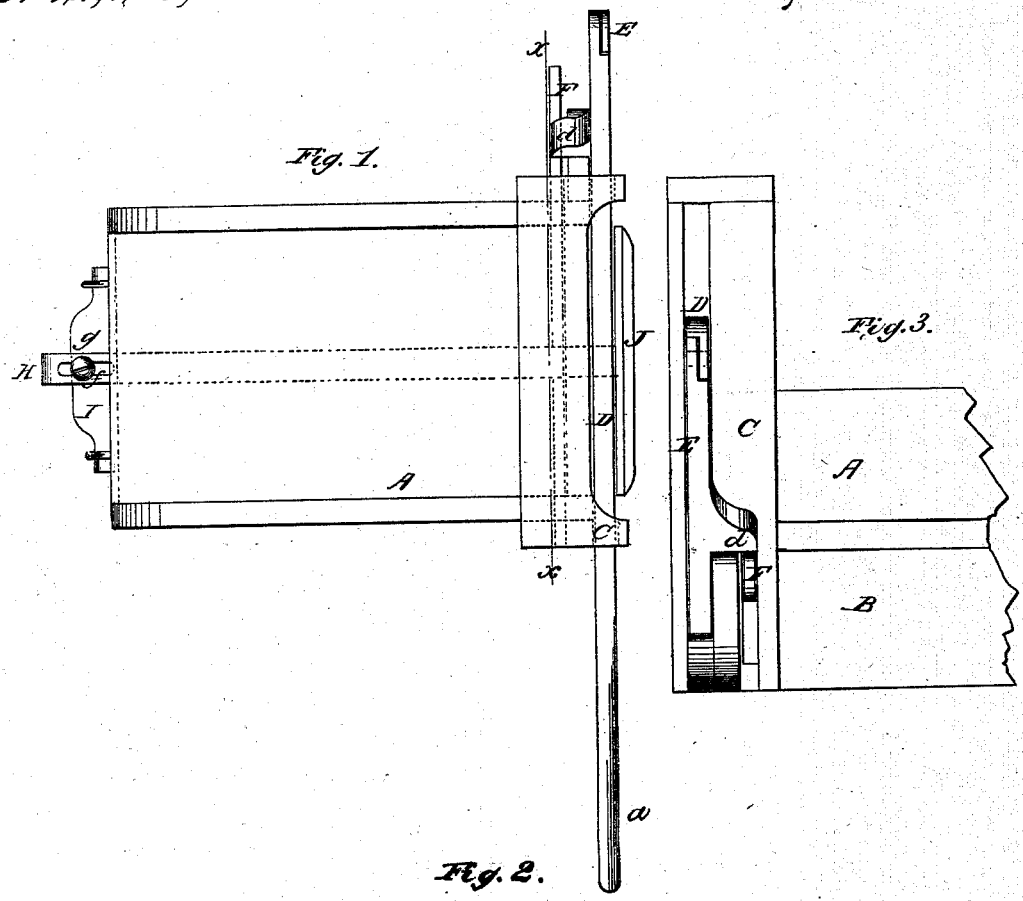
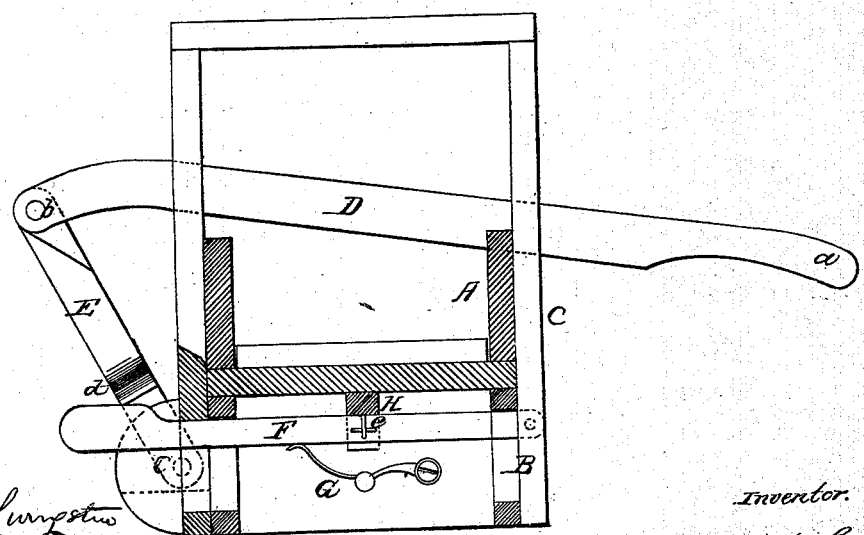

JOHN T. PLASS, OF NEW YORK, N. Y.

IMPROVED BREAD-CUTTER.

Specification forming part of Letters Patent No. 47,450, dated April 25, 1865.

*To all whom it may concern:*

Be it known that I, JOHN T. PLASS, of the city, county, and State of New York, have invented a new and Improved Device for Cutting or Slicing Bread and other Substances; and I do hereby declare that the following is a full, clear, and exact description thereof, which will enable others skilled in the art to make and use the same, reference being had to the accompanying drawings, forming part of this specification, in which—

Figure 1 is a plan or top view of my invention; Fig. 2, a transverse vertical section of the same, taken in the line $x$ $x$, Fig. 1; Fig. 3, an enlarged side view of a portion of the same.

Similar letters of reference indicate like parts.

This invention relates to a new and useful device for cutting or slicing bread, meat, vegetables, &c., for family or table use; and it consists in the employment or use of a knife and gage, arranged with or applied to a box so as to operate in a very efficient manner for the purpose specified.

A represents a box in which the article to be cut or sliced is placed. This box is open at both ends and at the top, and is supported at a suitable height by a proper base, B. To one end of the box A there is secured an upright frame, C, which may be of cast-iron, and has a slotted standard at each side of the box, in which standard a knife, D, works. This knife has a handle, $a$, at one end, and the opposite end is connected by a pivot bolt, $b$, to a bar, E, the lower end of which is attached by a pivot-bolt, $c$, to the end of the base. (See Fig. 2.)

The bar E is provided at its rear side with a lip or projection, $d$, which rests or bears upon a lever, F, having a transverse position underneath the box A, directly below the knife D. This lever F has a spring, G, bearing against its under side, and it is connected by links $e$ to a bar, H, which has a longitudinal position underneath box A, the rear end of said bar H passing through the rear end of the base B, and having a slot, $f$, made vertically in it, through which a screw, $g$, passes into a shaft, I, the bearings of which are on the rear of the base, as shown in Fig. 1. The front end of the bar H passes through the front end of the base B, and it has a vertical plate, J, attached to it, which extends along the whole width of the front of box A, and when the knife D is not forced down projects a trifle above the bottom of A, the spring G of lever F effecting that result. This plate J serves as a gage, and determines the width of the slices to be cut.

The operation is as follows: The article or substance to be cut is placed in the box A and against the gage J, and as the knife D is forced down by the operator the lip $d$ of bar E acts upon the lever F and forces down the plate or gage J, so that the slice may drop from the box A.

The knife, it will be seen, operates with a drawing cut, and it also will be seen that the width of the slice may be varied by regulating the distance of the plate or gage J from the front end of the box A, which is done by loosening the screw $g$ and shoving or moving the bar H until the gage J is in the proper or desired position.

I do not claim a knife, D, attached to a pivoted bar, E, and arranged with a box, A, for cutting articles or substances, for fodder-cutters have been thus constructed; but

I claim as new and desire to secure by Letters Patent—

The knife D and bar E, in combination with the automatically-moving gage J, all arranged to operate in the manner substantially as and for the purpose specified.

JOHN T. PLASS.

Witnesses:
M. M. LIVINGSTON,
WM. F. MCNAMARA.